(12) United States Patent
Bartosch et al.

(10) Patent No.: US 6,694,843 B2
(45) Date of Patent: Feb. 24, 2004

(54) PRELOADED SHOCK ABSORBING BUSHING AND CAM FOLLOWER

(75) Inventors: Georg Bartosch, Demarest, NJ (US); Todor S. Mihov, Hillsdale, NJ (US)

(73) Assignee: Intech Corporation, Closter, NJ (US)

( * ) Notice: Subject to any disclaimer, the term of this patent is extended or adjusted under 35 U.S.C. 154(b) by 0 days.

(21) Appl. No.: 10/012,958

(22) Filed: Nov. 5, 2001

(65) Prior Publication Data

US 2003/0084750 A1 May 8, 2003

(51) Int. Cl.$^7$ ............................................. F16H 53/06
(52) U.S. Cl. .......................................... 74/569; 74/567
(58) Field of Search .................. 74/569, 567; 384/222, 384/221; 72/94

(56) References Cited

U.S. PATENT DOCUMENTS

| | | | |
|---|---|---|---|
| 4,790,672 A | * | 12/1988 | Komplin ..................... 384/222 |
| 5,413,415 A | * | 5/1995 | Collinsworth ................ 384/508 |
| 5,467,628 A | * | 11/1995 | Bowlin et al. ................. 72/126 |
| 5,522,441 A | * | 6/1996 | Anselm et al. ........ 280/124.169 |
| 5,676,006 A | | 10/1997 | Marshall ........................ 72/94 |
| 5,794,965 A | * | 8/1998 | Stuker et al. ................ 384/222 |
| 5,961,219 A | * | 10/1999 | Maughan .................... 384/222 |
| 6,164,109 A | * | 12/2000 | Bartosch ......................... 72/94 |

* cited by examiner

Primary Examiner—David A. Bucci
Assistant Examiner—Brad Van Pelt
(74) Attorney, Agent, or Firm—Fay Kaplun & Marcin, LLP.

(57) ABSTRACT

A flexible bushing for a cam follower, comprising a substantially rigid inner sleeve including an inner cam follower engaging surface, a length of the inner sleeve being greater than a thickness of a ram into which the flexible bushing is inserted, a substantially rigid outer sleeve including an outer ram engaging surface, a length of the outer sleeve being substantially equal to the thickness of the ram, the inner and outer sleeves being substantially concentric, and a shock absorbing flexible material disposed between the inner and outer sleeves.

11 Claims, 6 Drawing Sheets

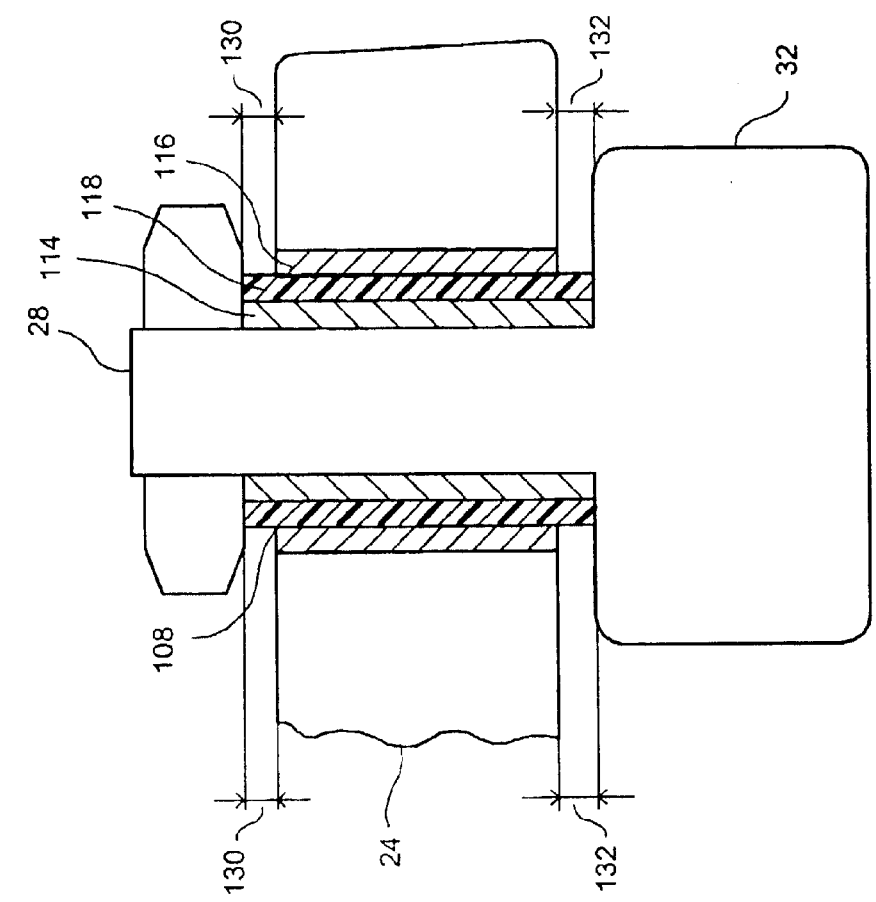
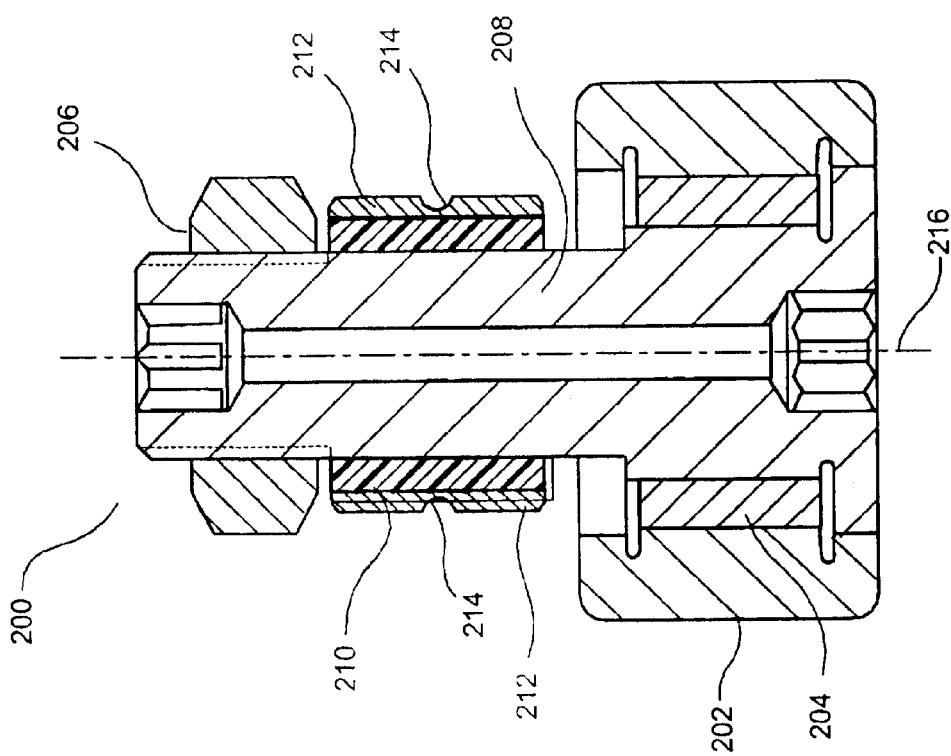
FIG. 8
FIG. 7

PRELOADED SHOCK ABSORBING BUSHING AND CAM FOLLOWER

BACKGROUND INFORMATION

Prior apparatus for reshaping cylindrical metal containers (e.g., cans) have included can supporting devices including, for example, spindle housings supporting spindle ram assemblies at intervals around the periphery of a cylindrical ram block portion of a turret. The spindle ram assemblies carry can reshaping tools which are rotatable about the spindle axes and which may be reciprocated along lines substantially parallel to the turret axis. The ram block is driven about the turret axis thereby causing the spindle ram assemblies to orbit the turret axis. When operating at high speeds, the cam followers of these devices are often brought into and out of contact with a cam causing an increased rate of wear and a higher incidence of failure for the cam followers. Specifically, in the common instance where a cam follower is overgreased, the rotational speed of the cam followers decreases significantly when they lose contact with the cam. Then when the cam followers come back into contact with the cam, the cam followers are suddenly accelerated and skidding occurs between the cam and the cam followers. This skidding is a significant source of cam follower wear and failure.

SUMMARY OF THE INVENTION

A flexible bushing for a cam follower, comprising a substantially rigid inner sleeve including an inner cam follower engaging surface, a length of the inner sleeve being greater than a thickness of a ram into which the flexible bushing is inserted, a substantially rigid outer sleeve including an outer ram engaging surface, a length of the outer sleeve being substantially equal to the thickness of the ram, the inner and outer sleeves being substantially concentric, and a shock absorbing flexible material disposed between the inner and outer sleeves.

In addition, a cam follower assembly, comprising a cam follower extending through an opening in a ram, the cam follower including a racer to follow a contour of a cam, wherein, when the cam exerts a deflection force on the racer, a flexible material is deformed to absorb the deflection force. Furthermore, a cam assembly, comprising a cam, a first cam follower inserted through a ram, the first cam follower including a first racer contacting the cam, and a second cam follower inserted through a flexible bushing in the ram, the second cam follower including a second racer contacting the cam, wherein, as the first and second cam followers move relative to the cam, the cam exerts a deflection force deflecting the second cam follower deforming the flexible bushing.

BRIEF DESCRIPTION OF DRAWINGS

FIG. 7 shows a cross-sectional view of an exemplary cam follower in an alternative exemplary embodiment of the present invention;

FIG. 8 shows a detail view of an exemplary cam follower according to the present invention;

DETAILED DESCRIPTION

Figure 1:
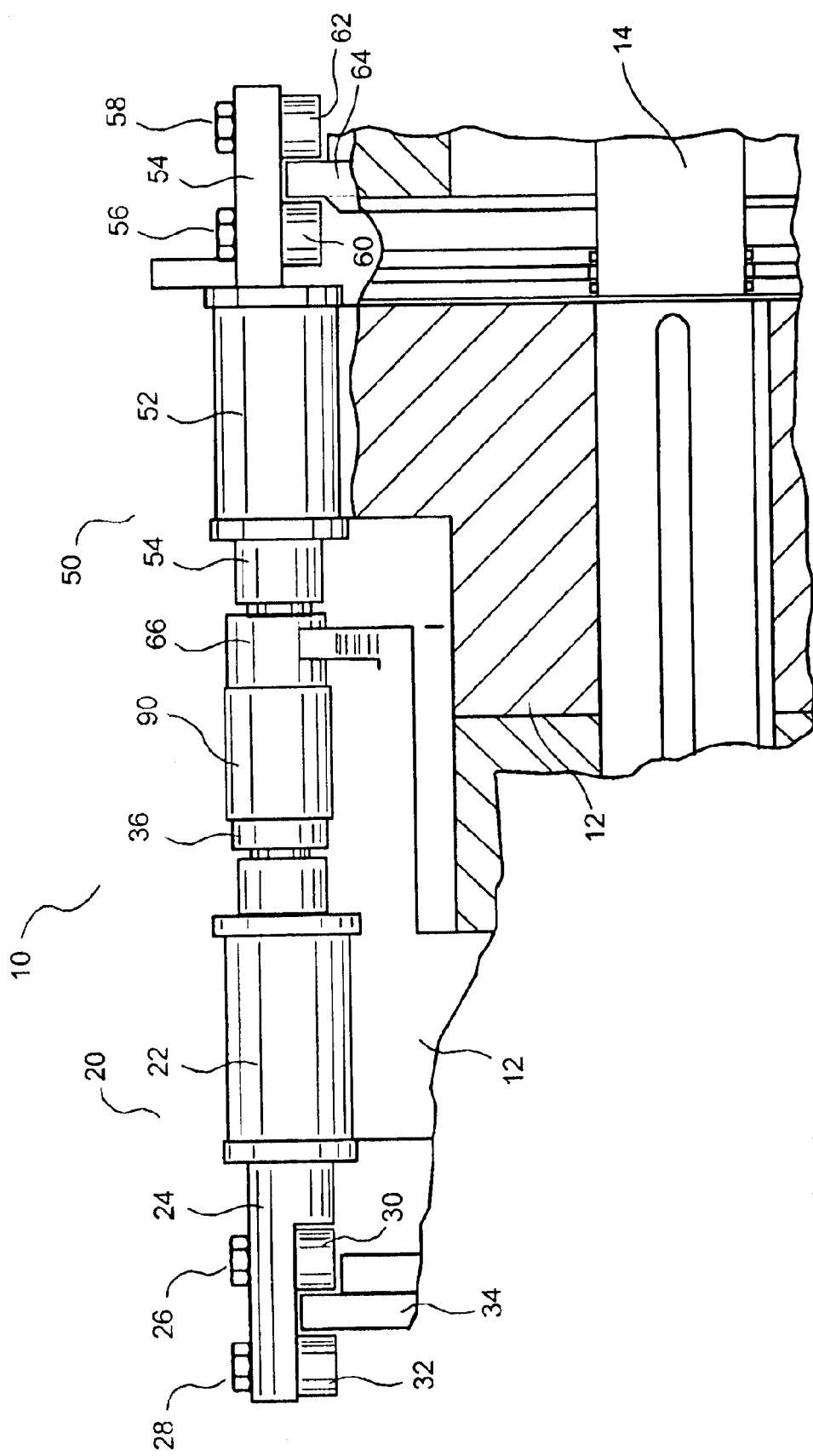
FIG. 1 shows a front elevation view of an exemplary embodiment of a can processing machine according to the present invention.

The present invention may be further understood with reference to the following description of preferred exemplary embodiments and the related appended drawings, wherein like elements are provided with the same reference numerals. It should be understood that the present invention may be implemented on any cam/cam follower arrangement operating at high frequency and the term cam/cam follower arrangement will be used throughout this description to generically refer to all such devices.

FIG. 1 shows an exemplary embodiment of a can processing machine 10. A turret 12 is mounted on a turret shaft 14 such that the turret 12 may rotate. Pairs of axially aligned ram assemblies 20 and 50 are mounted around the outer circumference of turret 12. The number of pairs of ram assemblies may vary based on the size of the ram assemblies, the size of the turret 12, the specific tooling operation, etc. Each ram assembly 20 and 50 includes a ram housing 22 and 52, respectively, which is fixed to turret 12 and a ram 24 and 54, respectively, which move axially within the corresponding ram housings 22 and 52.

A first end of the ram 24 includes cam followers 26 and 28 having racers 30 and 32, respectively. Similarly, a first end of the ram 54 includes cam followers 56 and 58 having racers 60 and 62, respectively. Cams 34 and 64 are provided at opposite ends of machine 10. The cam 34 engages racers 30 and 32 of and the cam 64 engages racers 60 and 62. Those of skill in the art will understand that cams 34 and 64 remain stationary while turret 12 rotates. As the turret 12 rotates, the racers 30 and 32 remain engaged with the surface of the cam 34 moving the cam followers 26 and 28 reciprocally as dictated by the shape of the cam 34. This, in turn, causes the ram 24 to reciprocate between a retracted position and an extended position within the ram housing 22. The same action occurs at the other end of machine 10 causing ram 54 to reciprocate in the same manner within housing 52. A typical can machine 10 has 2400 reciprocations per minute, but those skilled in the art will understand that the reciprocations may be more or less frequent depending on the operation.

This reciprocating movement may cause a shaping tool 66 at a second end of the ram 54 to contact a can 90 when the ram 54 is in the extended position, while a space extends between the can 90 and the shaping tool 66 when the ram 54 is in the retracted position. Similarly, a shaping tool 36 at a second end of ram 24 may contact the can 90 when the ram 24 is in the extended position, while the shaping tool 36 is moved out of the can 90 when the ram 24 is in the retracted position. Through the reciprocating movement, the shaping tools 36 and 66 may perform the desired operations on the can 90 (e.g., necking). Those of skill in the art will understand that there are numerous types of shaping tools 36 and 66 that may be used to shape a can or other workpiece and that multiple shaping tools or other types of assemblies may be attached to the second end of the rams 24 and 54 to perform operations on workpieces. The present invention is not limited to the type of can machine 10 described with reference to FIG. 1. The exemplary can machine 10 is only described to illustrate an example of a type of machine where the present invention may be used.

Figure 2:
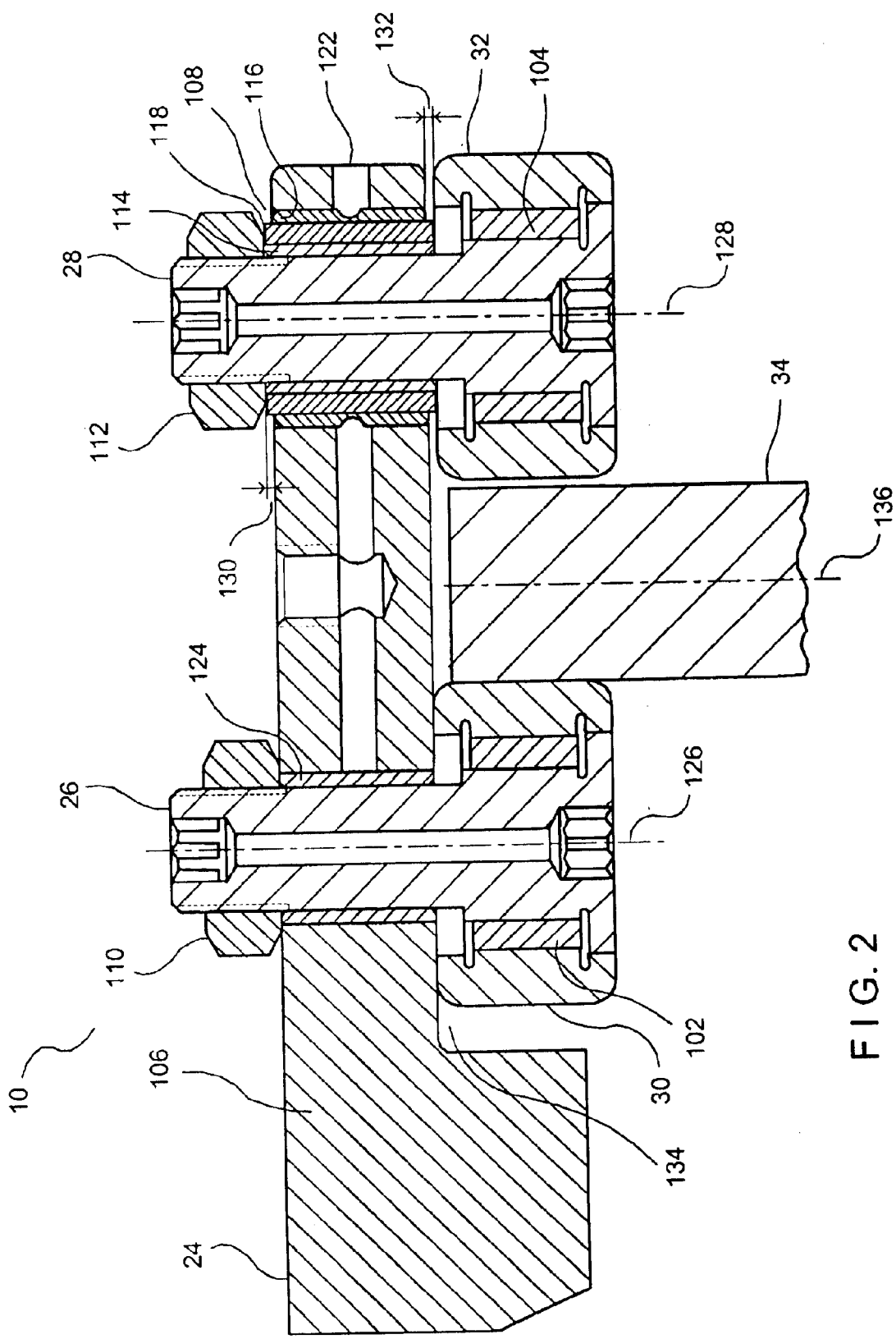
FIG. 2 shows a cross-sectional view of an exemplary cam follower assembly for a ram according to the present invention.
Figure 4:
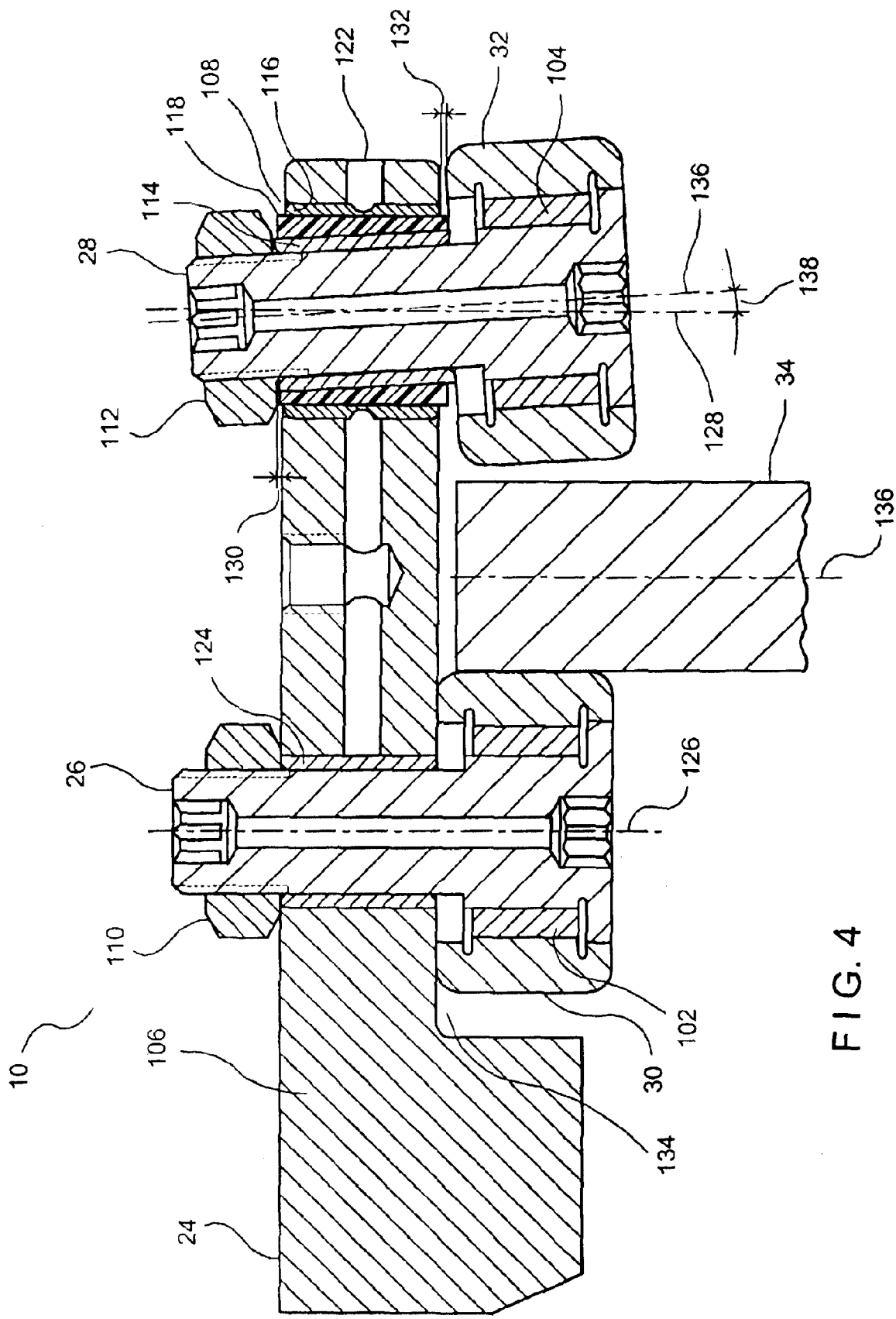
FIG. 4 shows a cross-sectional view of an exemplary cam follower assembly for a ram in a deflected position according to the present invention.

FIG. 2 shows an exemplary cam/cam follower arrangement 10 including a pair of cam followers 26 and 28 contacting opposite sides of a cam 34. The following description is provided for the pair of cam followers 26 and 28, but those of skill in the art will understand that the same arrangement may be used for the pair of cam followers 56 and 58. In addition, FIGS. 2 and 4 show a slight gap between the racers 30 and 32 and the cam 34. However, as described below, the present invention allows the racers 30 and 32 to maintain constant contact with the cam 34. The gaps are only shown in the figures to distinguish between the different elements illustrated in the figures. Each of the cam followers 26 and 28 includes a racer 30 and 32, respectively, rotatably mounted thereto by a bearing 102 and 104, respectively. Each of the cam followers 26 and 28 is received in a corresponding opening in a bushing 106 and 108 which may, for example, be press fit into a corresponding opening in the ram 24. Each of the cam followers 26 and 28 extends through a central opening defined by the corresponding bushing 106 and 108 to extend from a side of the ram 24 opposite the cam 34. Each of the cam followers 26 and 28 may be maintained in a desired position within the corresponding bushing 106 and 108 by, for example, nuts 110 and 112 and washers (not shown), respectively.

An exemplary embodiment of a shock absorbing bushing according to the present invention will be described with reference to the bushing 108. Those skilled in the art will understand that the bushing 106 may be formed of a single substantially rigid sleeve 124 or may simply be an opening machined through ram 24. A bushing 106 having a substantially rigid sleeve 124 is preferred when the ram 24 is made of a relatively soft material. When the ram 24 is a hard material (e.g., steel), the bushing 106 may be formed by machining an opening in the ram 24.

Figure 3:
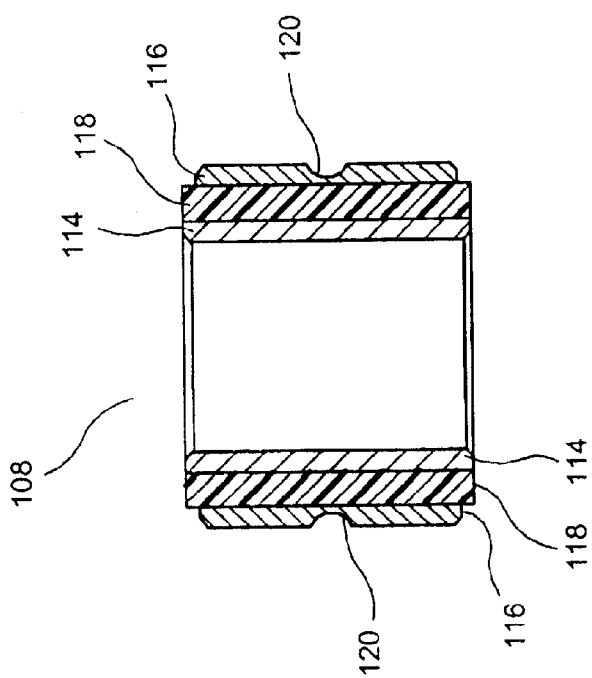
FIG. 3 shows a cross-sectional view of an exemplary bushing for the cam follower assembly according to the present invention.

FIG. 3 shows a detail of bushing 108 which may be formed of a substantially rigid concentric inner sleeve 114 and a substantially rigid outer sleeve 116 separated by a layer of flexible material 118. For example, the inner sleeve 114 and outer sleeve 116 may be formed of metal such as steel 4041, while the flexible material 118 may be formed, for example, of rubber such as rubber of durometer hardness 75. As described more fully below, the flexible material 118 will serve to absorb vibrations, provide a small degree of mobility to the cam follower 108 and allow for a preload on the cam follower 108. Those skilled in the art will understand that a wide variety of materials may be substituted for the exemplary materials listed herein without departing from the scope of the present invention.

The thickness of the flexible material 118 may vary depending on the operating specifics of particular designs. However, according to the exemplary embodiment, the flexible material 118 will preferably be formed of hard rubber between 2 and 3 mm, more preferably approximately 2.5 mm. In addition, an axial length of the outer sleeve 116 will preferably be substantially equal to a thickness of the ram 24 so that the ends of the outer sleeve 116 are flush with the surfaces of the ram 24. The axial length of the flexible material 118 and the inner sleeve 114 will preferably exceed that of the outer sleeve 116 so that the flexible material 118 and the inner sleeve 114 extend past one or both ends of the outer sleeve 116. For example, for an outer sleeve 116 of approximately 0.78 inches in length, the flexible material 118 and the inner sleeve 114 may be 0.86 inches in length extending approximately 0.04 inches (1 mm) beyond both ends of the outer sleeve 116.

A groove 120 may extend around the entire circumference of the outer sleeve 116. The centerline of the groove 120 may preferably extend around the outer sleeve 116 at a point approximately midway between the ends thereof. Thus, a set screw inserted into an opening 122 (FIG. 2) may engage the groove 120 to secure the bushing 108 in a desired position with respect to the ram 24. In this manner, the bushing 108 may be precisely located within the ram 24 (e.g., outer sleeve 116 substantially flush with the surfaces of the ram 24. Those of skill in the art will understand that bushing 108 may be secured within the ram 24 using other methods, for example, press fitting, mechanical fasteners, chemical fasteners (e.g., epoxy), etc. In addition, the bushing 108 may be formed as an integral part of the ram 24 or a removable portion of the ram 24 (described in greater detail below).

In mounting the cam follower 28 into the bushing 108 with the nut 112, the clamping force is developed on the inner sleeve 114 leaving gaps 130 and 132 between the cam follower 28 and the surface of the ram 24. FIG. 8 shows a detail view of the cam follower 28 showing the gaps 130 and 132 which will be substantially the same size as the length that the inner sleeve 114 extends from the outer sleeve 116 which is substantially flush with the surfaces of the ram 24. In the examplary embodiment described above, this length was approximately 1 mm on both ends, meaning that gaps 130 and 132 will be approximately 1 mm. The clearance should be between 5 and 10% of the diameter of the cam follower shaft, preferably at least one (1) mm. As will be described in greater detail below, the cam follower 28 will deflect such that the axis 128 will no longer be parallel with the axis 126 of the cam follower 26. When this deflection occurs, the gap 132 must be large enough that the racer 32 does not come in contact with the surface of the ram 24. If the racer 32 were to contact the surface of the ram 24, it would prevent the racer 32 from rotating freely while it was in contact with the cam 34. Those of skill in the art will understand that a gap 134 will also extend between the racer 30 of the cam follower 26 and the ram 24 such that racer 30 may freely rotate about axis 126.

In a first exemplary embodiment, when the cam 34 is inserted (in its neutral or zero displacement section) and engages the racers 30 and 32 of cam followers 26 and 28, respectively, the axes 126 (of cam follower 26), 128 (of cam follower 28) and 136 (of cam 34) are substantially parallel (as shown in FIG. 2). This arrangement excludes a preload which is described in greater detail below. As the turret 12 rotates and the racer 32 follows the contour of the cam 34, a high force is exerted by the cam 34 against racer 32. This force is a high frequency force based on the shape of the cam 34 and the speed of rotation of the turret 12. In response to this impact, cam follower 28 is deflected and the flexible material 118 of bushing 108 is slightly deformed to absorb any shock due to the deflection force.

FIG. 4 shows shows a cross-sectional view of an exemplary cam follower 28 in a deflected position. As described above, the cam follower 28 follows the contour of the cam 34. During the working cycle (one rotation of turret 12), when the ram 24 is pulled away from the can 90, the cam 34 profile rises, presenting a sudden and steep incline in the path of the cam follower 28. The force resulting from the rotational impact of the cam follower 28 on the incline (curvature) of the cam 34 and the acceleration of the mass presented by the ram 24 causes the cam follower 28 to deflect. This deflection force is transmitted from the cam follower 28 to the inner sleeve 114 of the bushing 108 and through to the flexible material 118 of the bushing 108. As shown in FIG. 4, this deflection force causes the flexible material 118 to be compressed in areas and expanded in other areas. This action of the flexible material 118 absorbs the high frequency shock load exerted by the cam 34 on the cam follower 28. However, as the cam follower 28 is deflected, the outer sleeve 116 of bushing 108 remains in the same position relative to the ram 24.

The deflection of the cam follower 28 is illustrated in FIG. 4 by showing the original axis 128 before any deflection and the new axis 136 after the deflection. The deflection is shown as angle 138 which may be, for example, three to five degrees (3°–5°) for an exemplary cam and cam follower. When this deflection occurs, the width of the gaps 130 and 132 is decreased. However, as described above, the width of the gaps 130 and 132 is selected so that the deflection does not completely eliminate the gaps 130 and 132 and the racer 32 may continue to freely rotate without contacting the surface of the ram 24.

The racer 32 of the cam follower 28 is crowned such that, when in the neutral position, a maximum diameter portion of the crown contacts the cam 34 (i.e., the maximum contact area between the racer 32 and the cam 34). When the cam follower 28 is deflected, the contact between the racer 32 and the cam 34 remains on the crown within a short distance of the center thereof and within a desired contact area surrounding the center of the crown. The crown is sized so that, at a time of maximum deflection of the racer 32, the cam 34 contacts the crown so that wear on the racer 32 is reduced, thereby prolonging the life of the cam follower 28. In other words, the present invention maintains contact between the racer 32 and the cam 34 over a maximum contact area from the neutral position through the largest angle of deflection so that there is no single point of wear on the racer 32.

As the turret 12 continues to rotate away from the incline back to the neutral position of the cam 34, the deflection force exerted on the cam follower 28 decreases and the flexible material 118 returns to its original shape. When the cam 34 reaches its neutral position, the cam followers 26 and 28 and the cam 34 are returned to the parallel position as shown in FIG. 2. As described above, the turret 12 may be rotated at a speed which deflects the cam follower 28 hundreds of times per minute. Thus, flexible material 118 may absorbs thousands of shock loads during a period of continuous operation (e.g., a twenty-four period) which could cause excessive wear on the cam follower 28 and the cam 34.

In a second exemplary embodiment, a preload may be applied to the cam follower 28 in order to maintain the racers 30 and 32 in contact with the cam 34. To obtain a preload, the cam followers 26 and 28 may be aligned so that, if cam 34 is not received therebetween, a distance separating the racers 30 and 32 of the corresponding cam followers 26 and 28 is less than the width of the neutral position of the cam 34 (e.g., the thinnest portion of the cam 34) to be received therebetween. For example, for a cam 34 having a neutral position thickness of 1.0045 inches, the separation between the racers 30 and 32 may be 1.0035 inches, resulting in a preload of 0.001 inches. Such a preload will result in a deflection of less than one degree (<1°) of the cam follower 28 when the cam 34 is inserted between the racers 30 and 32 (e.g. angle 138 in FIG. 4 is less than 1° when the neutral position of the cam 34 is between the racers 30 and 32). Thus, when the cam 34 is received between these racers 30 and 32, the racers 30 and 32 will be biased toward the surface of the cam 34 maintaining the cam followers 26 and 28 in contact with the cam 34 even when the cam 34 moves at high speed. Thus, the rotational speed of the racers 30 and 32 remains substantially constant avoiding rapid acceleration and deceleration associated with loss of contact.

The operation of the cam follower 28 and the bushing 108 during the rotation of the turret 12 is the same as described above for the first embodiment. The cam follower 28 will be deflected by the force of the cam 34 as the turret 12 rotates and the flexible material 118 of the bushing 108 will absorb the shock caused by the deflection force of the cam 34. The maximum deflection of the cam follower 28 will be increased by the amount of the preload on the cam follower 28 (e.g., 0.5°) and the cam follower 28 will return to its original position (i.e., the position where the only deflection is caused by the preload) when the turret 12 rotates the cam follower to the neutral position of the cam 34. Thus, the flexible bushing 108 allows for a preload and absorbs shock, both of which contribute to extending the life of the cam follower 28 and the cam 34, as well as allowing the turret 12 to rotate faster, thereby increasing the efficiency of the machine 10. The permanent contact of the cam followers 26 and 28 with the cam 34 and the constant racer rotation provided by the exemplary embodiment of the present invention extends the life of the cam followers and cam. The flexible bushing 108 is also designed so that it may be retrofitted onto existing rams.

Figure 5:
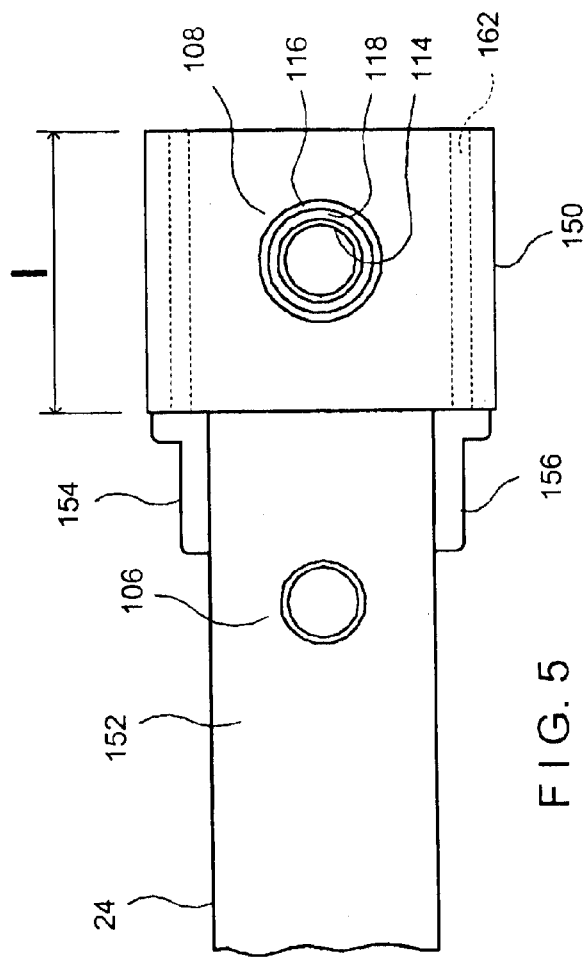
FIG. 5 shows a top view of an exemplary ram having a removable end with an exemplary flexible bushing according to the present invention.
Figure 6:
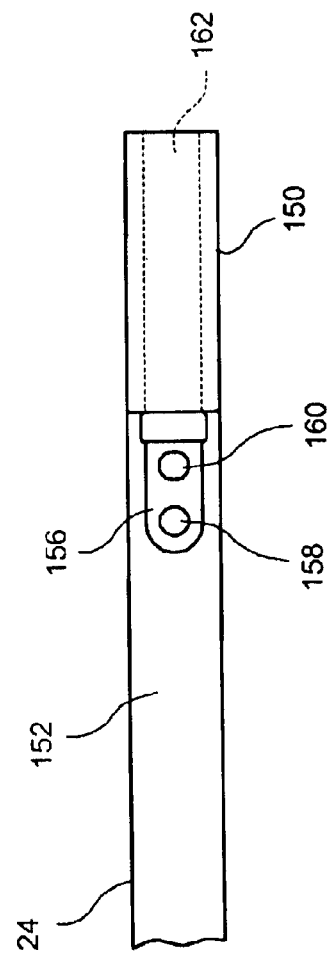
FIG. 6 shows a side view of an exemplary ram having a removable end according to the present invention.

As shown in FIGS. 1 and 2, the bushing 108 with the flexible material 118 is for the cam followers 28 and 58 which are closest to the end of the rams 24 and 54, respectively. FIG. 5 shows a top view of a ram 24 having a removable end 150 with a bushing 108. The ram 24 has a solid portion 152 having a bushing 106 for the insertion of a cam follower. The ram 24 also has a removable end 150 having a flexible bushing 108 (including inner sleeve 114, outer sleeve 116 and flexible material 118). The removable end 150 is connected to the solid portion 152 of the ram 24 using the couplers 154 and 156. FIG. 6 shows a side view of the ram 24 with the coupler 156 and the solid portion 152 having two vias 158 and 160 to fasten the coupler 156 to the solid portion 152. The fastening may be accomplished using, for example, two screws or bolts. The coupler 154 is similarly attached to the solid portion 152. FIG. 6 additionally shows a via 162 which extends the full length of the removable end 150 and into the coupler 156. Another screw maybe used to fasten the removable end 150 to the coupler 156, thus attaching the removable end 150 to the solid portion 152 of the ram 24. Therefore, if the bushing 108 or the cam follower inserted through the bushing 108 becomes worn so that a replacement is needed, the removable end 150 may be removed by simply taking out two screws that attach the removable end 150 to the couplers 154 and 156. When the bushing 108 or the cam follower has been repaired, the removable end 150 may be reattached to the ram 24 using the two screws. In addition, a replacement removable end 150 may replace a removable end 150 with a worn bushing 108 or cam follower. The removable end 150 may also be removed for access to the cam. The removable end 150 allows for a fast and easy maintenance to a machine implementing exemplary embodiments of the present invention. The length (l) of the removable end 150 determines the amount of preload for the cam followers (e.g., cam followers 26 and 28). The shorter the length (l), the greater the amount of preload. The preload is achieved during assembly by tightening the two screws.

Figure 10:
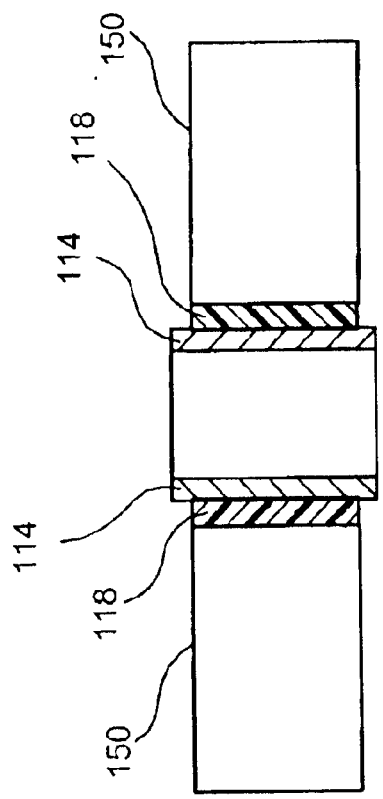
FIG. 10 shows a side view of an alternative embodiment of a removable end according to the present invention.
Figure 9:
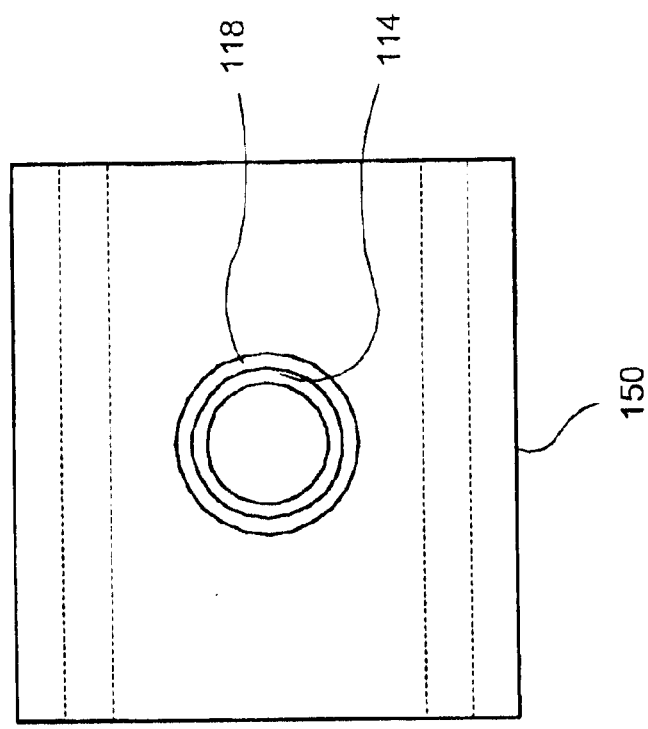
FIG. 9 shows a top view of an alternative embodiment of a removable end with an exemplary flexible bushing according to the present invention.

FIGS. 9 and 10 show an alternative embodiment of the removable end 150. In this embodiment, the flexible material 118 is a part of the removable end 150, while the inner sleeve 114 may also be part of the removable end 150 or part of the cam follower (not shown), for example, the shank or neck of the cam follower. In this embodiment, the outer sleeve is not shown because the removable end 150 forms the outer sleeve to which the flexible material 118 is formed. When a cam follower is inserted through the removable end 150, the flexible material 118 operates in the same manner as described above to absorb the deflective force on the cam follower.

FIG. 7 shows an alternative embodiment of a cam follower 200. The cam follower 200 has a racer 202 riding on a bearing 204 and may be secured to a ram using a nut 206. In the neck area of the cam follower 200, an entire circumference of the solid center core 208 is surrounded by a flexible material sleeve 210, which may be formed of the same material as the flexible material 118 of the bushing 108 described above. The flexible material sleeve 210 may be, for example, vulcanized to the neck or shank of the cam follower. The flexible material sleeve 210 is surrounded by a substantially rigid sleeve 212 having a groove 214. The flexible material sleeve 210 provides substantially the same function as the flexible material 118 of the bushing 108, while the substantially rigid sleeve 212 and the groove 214 provide substantially the same function as the outer sleeve 116 and the groove 120 of the bushing 108. When using the cam follower 200, it is not necessary to use a bushing 108 including the flexible material 118 as described above. Rather, the cam follower 200 may be press fit directly into the ram and secured via set screws that engage groove 214 of rigid sleeve 212 (e.g., two set screws which oppose each other 180°). Those of skill in the art will understand that the nut 206 may be used for saftey so that in the event that the flexible material sleeve 210 wears out, the cam follower 200 will be prevented from slipping through the ram into the machine.

The flexible material sleeve 210 and the rigid sleeve 212 should be formed on the shank so that when inserted into the ram, there are gaps between the ram and the racer 202, for example, gap 132 as shown in FIG. 8. As a deflection force is exerted by a cam on the cam follower 200, the cam follower 200 will deflect off of the axis 212 in the same manner as described above for cam follower 28. However, instead of the flexible material of the bushing absorbing the shock of the deflection force, the flexible material 210 of the cam follower 200 will absorb the shock by compressing in areas and expanding in other areas. When the deflection force is decreased or taken away completely, the flexible material 210 returns to its original shape with the cam follower 200 parallel to the axis 216. The cam follower 200 may also be used to form a preload.

In the preceding specification, the present invention has been described with reference to specific exemplary embodiments thereof. It will, however, be evident that various modifications and changes may be made thereunto without departing from the broadest spirit and scope of the present invention as set forth in the claims that follow. The specification and drawings are accordingly to be regarded in an illustrative rather than restrictive sense.

What is claimed is:

1. A cam follower assembly, comprising:
   a cam follower extending through an opening in a ram, the cam follower including a racer to follow a contour of a cam; and
   a flexible elastomeric material inserted into the opening between the cam follower and the ram, wherein, when the cam exerts a deflection force on the racer, the flexible elastomeric material is deformed to absorb the deflection force.

2. The cam follower assembly of claim 1, further comprising a flexible bushing including the flexible material.

3. The cam follower assembly of claim 1, wherein the flexible material is a flexible sleeve portion of the cam follower.

4. The cam follower assembly of claim 1, wherein, when the racer engages the cam in a neutral position, the cam follower is deflected forming a preload.

5. The cam follower assembly of claim 1, wherein the cam follower extends through a removable end of the ram.

6. The cam follower assembly of claim 5, wherein the flexible material is a flexible sleeve portion of the ram.

7. The cam follower assembly of clam 5, wherein, when in operation, the removable end of the ram remains in a fixed position relative to a fixed portion of the ram.

8. A cam assembly, comprising:
   a cam;
   a first cam follower inserted through a ram, the first cam follower including a first racer contacting the cam; and
   a second cam follower inserted through a flexible bushing including an elastomer in the ram, the second cam follower including a second racer contacting the cam, wherein, as the first and second cam followers move relative to the cam, the cam exerts a deflection force deflecting the second cam follower which deforms the elastomer of the flexible bushing to absorb the deflection force.

9. The cam assembly of claim 8, wherein a distance between the first racer and the second racer is less than a thickness of the cam in a neutral position, thereby forming a preload.

10. The cam assembly of claim 8, wherein the first cam follower is inserted through a fixed portion of the ram and the second cam follower is inserted through a removable end of the ram.

11. The cam assembly of claim 10, wherein, when the cam assembly is operable, the removable end of the ram remains in a fixed position relative to the fixed portion of the ram.

* * * * *